United States Patent [19]
Nesbitt et al.

[11] Patent Number: 5,662,216
[45] Date of Patent: Sep. 2, 1997

[54] JEWEL CASE FOR COMPACT LASER DISC

[76] Inventors: Alexander H. Nesbitt, 29 Elm St., Newport, R.I. 02840; Thomas A. Garland, 76 Reservoir Cir., Jamestown, R.I. 02835

[21] Appl. No.: 559,443

[22] Filed: Nov. 15, 1995

[51] Int. Cl.$^6$ .................................................. B65D 85/57
[52] U.S. Cl. ........................................ 206/308.1; 206/309
[58] Field of Search ................................. 206/308.1, 307, 206/307.1, 309–312, 232

[56] References Cited

U.S. PATENT DOCUMENTS

| | | |
|---|---|---|
| 4,630,732 | 12/1986 | Snyman . |
| 4,694,957 | 9/1987 | Ackeret ................................. 206/309 |
| 4,747,484 | 5/1988 | Ackeret ................................. 206/309 |
| 4,964,510 | 10/1990 | Loyd . |
| 5,000,316 | 3/1991 | Lerner . |
| 5,011,010 | 4/1991 | Francis et al. . |
| 5,096,064 | 3/1992 | Rufo, Sr. et al. ...................... 206/309 |
| 5,135,105 | 8/1992 | Schmeisser . |
| 5,135,106 | 8/1992 | Morrone . |
| 5,265,721 | 11/1993 | Castritis .............................. 206/308.1 |
| 5,360,106 | 11/1994 | Nakayama et al. ..................... 206/308.1 |
| 5,399,713 | 3/1995 | Taniyama ............................ 206/308.1 |
| 5,422,875 | 6/1995 | Bribach ............................... 206/312 |
| 5,425,451 | 6/1995 | Blase ................................. 206/309 |

Primary Examiner—Jimmy G. Foster
Assistant Examiner—Luan K. Bui
Attorney, Agent, or Firm—Salter & Michaelson

[57] ABSTRACT

A jewel case for a compact laser disc consists of a transparent hinged case and a disc holder received inside the case. The case is hingeably movable between a closed position wherein the case defines an interior cavity and an edge opening, and an open position wherein the interior cavity is exposed. The disc holder includes a spine adjacent the hinge edge which merges outwardly from a central portion thereof in a generally U-shaped configuration to form a pair of spaced arms. The disc holder further includes a raised shoulder extending in an arcuate contour around the arms and the spine with the arcuate contour opening outwardly toward the edge opening. The raised shoulder cooperates with the arms and spine to define a ledge which supports the edge margin of the disc while the raised shoulder engages the side edges of the disc. The raised shoulder extends in an arc wherein the end points of the arc define capture points which capture the disc within the arcuate contour when the disc is received between the arms. The disc can be mounted in the disc holder while the case is open, or can be inserted into the disc holder through the edge opening while the case is closed. A cam arrangement is provided for resiliently deflecting the arms outwardly to a deflected position to disengage the capture points from the side edges of the disc thereby releasing the disc from the holder.

14 Claims, 9 Drawing Sheets

JEWEL CASE FOR COMPACT LASER DISC

BACKGROUND AND SUMMARY OF THE INVENTION

The instant invention relates to storage cases for disc shaped elements, and more particularly to a jewel case for a compact audio laser disc.

Compact audio laser discs are typically packaged in individual jewel cases. Such cases usually include base and cover portions which are hinged along an edge so that they open for access to the interior of the case. The base portion of the case is usually provided with a disc holder having a plurality of centrally located, radially inwardly extending fingers which grasp the center opening of the compact disc. The cover portion of the case includes tabs which extend inwardly from the sides in spaced relation to the top cover to retain literature, printed materials, or a pamphlet. The sheet is visible through the transparent cover, and contains written information for purposes of identifying the disc held therein. While the currently available jewel cases have been found to be highly effective for their intended purpose, i.e. durable storage and protection of the disc, there are drawbacks which the current invention intends to address. The most significant drawback of the prior jewel case is that it requires two hands to hingeably open the case and remove the disc therefrom. Opening of the case requires one hand to grasp the side edges of the base portion and the other hand to grasp the top and bottom edges of the cover portion. The current case further requires the user to grasp the outer edges of the disc to remove it from the disc holder while grasping the base portion. It can thus be appreciated that a certain amount of manipulation of the case is required to insert and remove the disc. While this is not a major problem for most persons, especially those persons who use compact disc players in a home environment, it is nevertheless cumbersome in certain situations. For example, compact disc players are now finding widespread acceptance in car audio systems, and other portable audio systems. In particular, it has been found that drivers have difficulty trying to open a conventional jewel case while operating a motor vehicle. This situation causes such users to leave compact discs out of their cases where they can be scratched or broken or exposed to intense heat, any of which can damage the audio quality of the disc.

The instant invention provides two embodiments of an improved jewel case which has the benefits of existing jewel cases, i.e. that of a top opening hinge arrangement, while additionally providing a cam operated capture and release mechanism wherein the disc can be inserted into and removed from the jewel case with one hand. The first embodiment of the improved jewel case comprises a transparent hinged case and resilient disc holder that is received inside the case. The case includes a transparent base and a transparent cover which are hingeably joined along a side edge thereof. The base and cover are hingeably movable to a closed position wherein the base and cover define an interior cavity for receiving a disc therein and an edge opening opposite the hinge edge. The base and cover are further movable to an open position wherein the interior cavity is exposed for access to the disc. The disc holder is received on top of the base and includes a spine portion adjacent the hinge edge which merges outwardly from a central portion thereof in a generally U-shaped configuration to form a pair of spaced arm portions which terminate in distal ends adjacent the edge opening. The disc holder further includes a raised shoulder extending in an arcuate contour around the arm portions and the spine portion with the arcuate contour opening outwardly toward the edge opening. The raised shoulder cooperates with the arm portions and the spine portion to define a ledge which supports the edge margin of the disc while the raised shoulder engages the side edges of the disc. The raised shoulder extends in an arc of greater than 180 degrees wherein the end points of the arc define capture points which capture the disc when the disc is received between the arm portions. More specifically, the centerline of the arc is disposed along the longitudinal centerline of the case so that the opening of the arc faces the edge opening of the case and the capture points are symmetrical with respect to the centerline. In this arrangement, the disc can be mounted in the disc holder while the case is open by pressing the disc downwardly into the arcuate recess formed by the ledge and raised shoulder, or can be inserted into the disc holder through the edge opening while the case is closed. It is pointed out that the edge opening includes a downwardly extending arcuate ridge on the front edge of the cover and an upwardly extending arcuate ridge on the front edge of the base such that the ridges define an elongate oval edge opening. The ridges of the oval edge opening engage only the peripheral side edges and edge margins of the disc and guide movement of the disc to prevent scratching of the optical surface of the disc when the disc is inserted through the edge opening. The case further includes two pairs of guide tabs which guide insertion of the disc into the interior cavity when inserted through the edge opening. The guide tabs further function to hold a sheet of written material adjacent to the transparent cover to identify the disc therein. To release the disc from the disc holder, a cam arrangement is provided for resiliently deflecting the arm portions outwardly to a deflected position to disengage the capture points of the raised shoulder from the side edges of the disc. The cam arrangement comprises a pair of rearwardly extending, opposing fingers positioned on the outer peripheral edges of the arm portions wherein inward pressure on the fingers causes movement of the arm members from a normal position to their deflected position. The cover includes opposing notched areas for accessing and exerting pressure on the opposing fingers when the base and the cover are in the closed position. In use, the operator may hingeably open the cover and mount a disc in the disc holder by positioning the disc in the arcuate contoured recess formed by the raised shoulder, and further may remove the disc by grasping the side edge of the disc and pulling upwardly, similarly to a conventional disc holder arrangement. However, the operator may also maintain the case in a closed position and slidably insert the disc into the disc holder through the edge opening. The arcuate ridges at the edge opening, along with the guide tabs, effectively guide the disc between the arm portions so that it is properly received and captured in the arcuate contour of the disc holder. In the latter mode of operation, inward movement of the disc causes the disc edges to engage the outer edge of the raised shoulder and urge the arm portions outwardly to enable the disc to pass the capture points of the raised shoulder. The operator may further release the disc from the case while the case is maintained in the closed position by applying inward pressure to the fingers of the disc holder. Inward pressure of the finger urges the arm portions in an outward direction thereby disengaging the capture points of the raised shoulder from the peripheral side edges of the disc and releasing the disc for sliding movement out of the edge opening of the case. It is important to note that pressure may be applied to the fingers with one hand wherein the thumb and forefinger of the operator are simultaneously squeezed together thus allowing removal of the disc from the case with only one hand.

In a second embodiment, the cover and base are substantially identical to that of the first embodiment. However, the disc holder comprises a spine portion with arm portions extending outwardly from end portions of spine. The arm portions include curved appendages which extend rearwardly and inwardly to define a generally U-shaped contour. The appendages terminate in facing actuator tabs aligned along the longitudinal centerline of the case. The release mechanism for urging the arm portions outwardly comprises a wedge-shaped cam disposed for sliding movement in the space formed between the facing actuator tabs of the disc holder. The cam is slidably movable in a downward direction to forcibly urge the actuator tabs apart thereby moving the arm portions thereof in an outward direction.

Accordingly, among the objects of the instant invention are: the provision of a jewel case for storing and protecting a disc shaped element; the provision of a jewel case for a compact audio laser disc in which the disc can be inserted into and removed from the case with one hand; the provision of a compact disc jewel case including a cam operated capture and release mechanism for capturing and releasing the compact laser disc; and the provision of a compact disc jewel case including guide elements for guiding insertion of the disc into the case without scratching the optical surfaces of the disc.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Referring now to the drawings, a first embodiment of the improved jewel case of the instant invention is illustrated and generally indicated at 10 in FIGS. 1–10.

Figure 1:
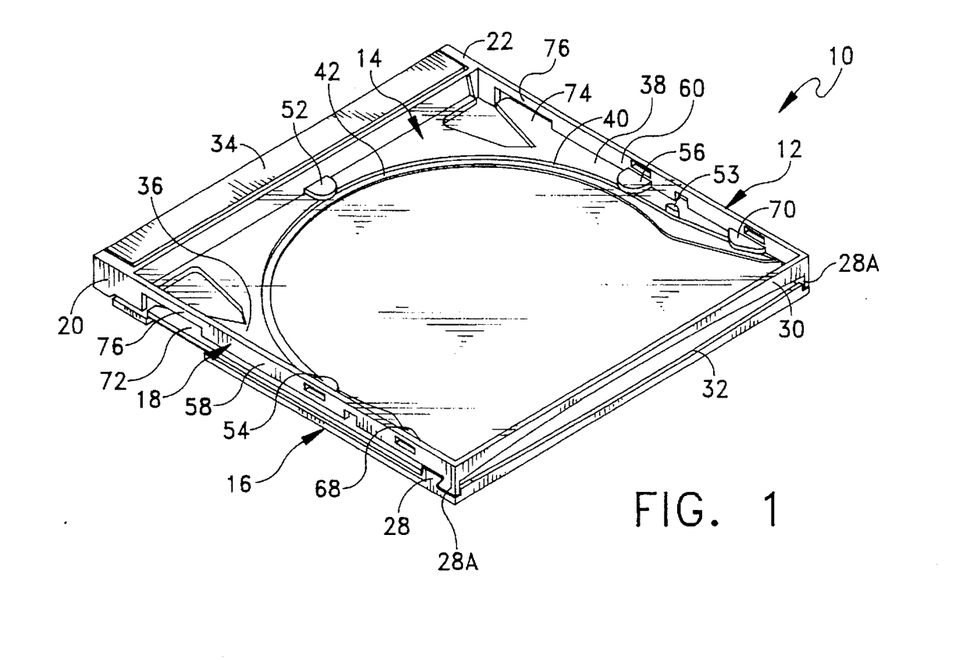
FIG. 1 is a perspective view of a first embodiment of the instant jewel case.
Figure 2:
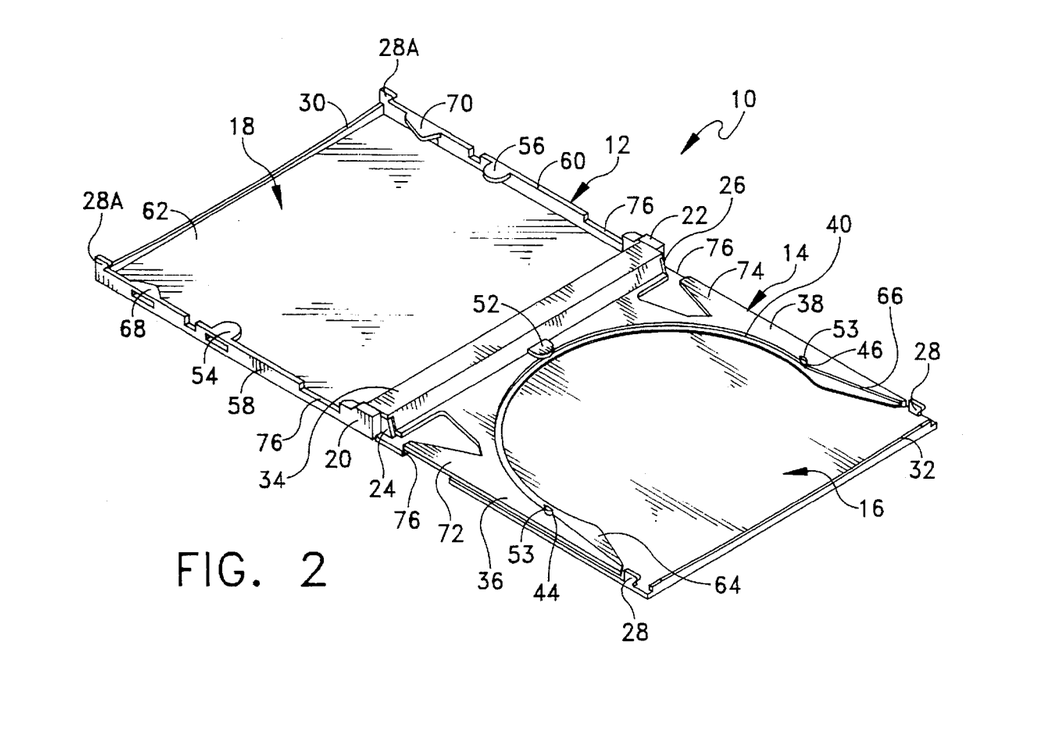
FIG. 2 is another perspective view thereof with the cover thereof in an open position.
Figure 6:
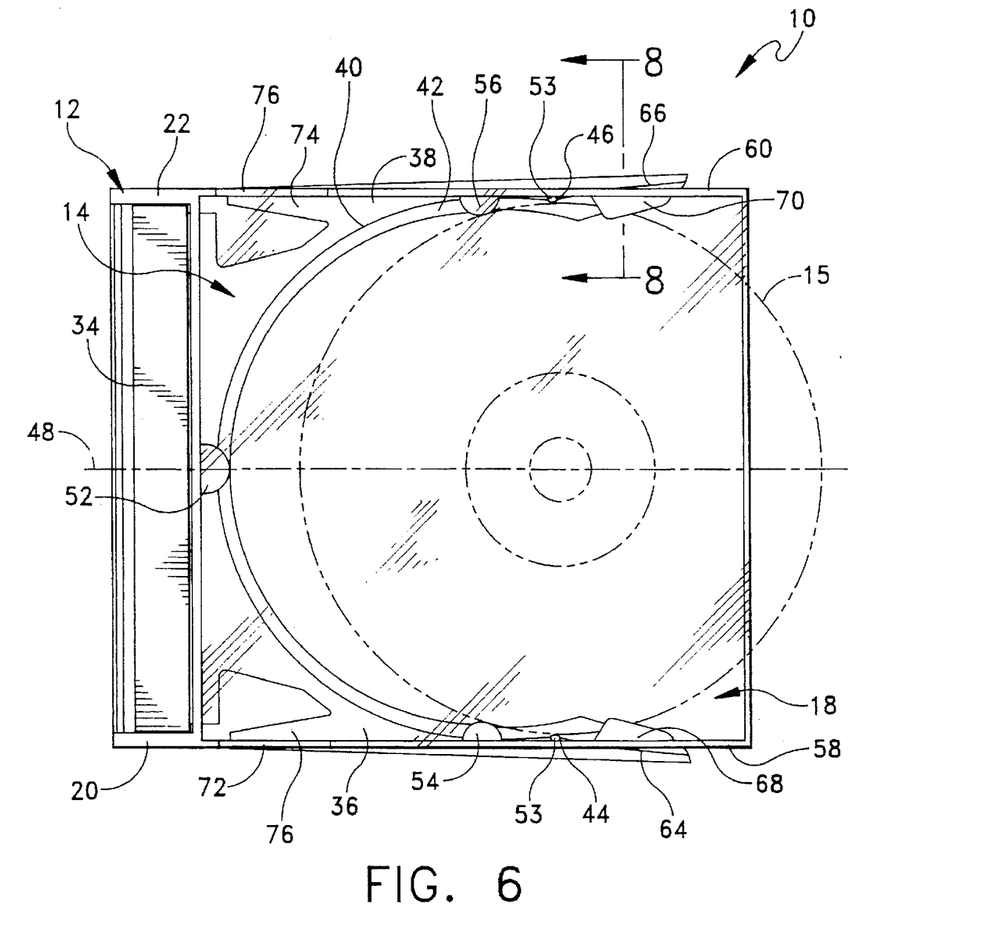
FIG. 6 is another top view thereof with the cover in a closed position and a disc partially inserted through the edge opening.
Figure 7:
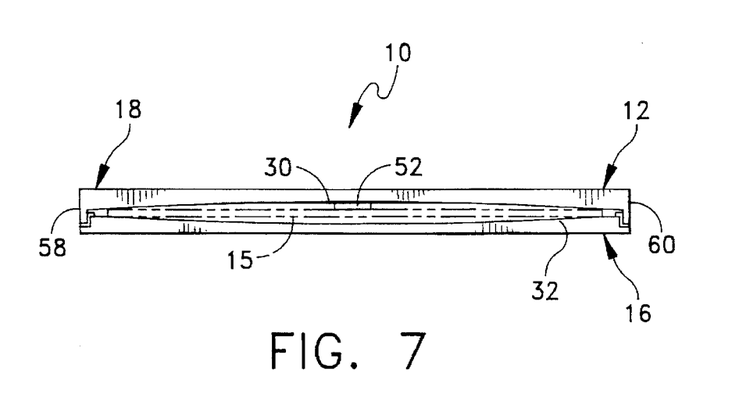
FIG. 7 is an end view thereof showing the edge opening.

The improved jewel case 10 comprises a transparent hinged case generally indicated at 12 and resilient disc holder generally indicated at 14 that is received inside the case 12 for receiving a disc 15 therein. The case 12 includes a transparent base generally indicated at 16 and a transparent cover generally indicated at 18 which are hingeably joined along a side edge thereof. More specifically, the base 16 includes opposing hinge plates 20, 22 adjacent a first side edge thereof while the cover 16 includes opposing hinge plates 24, 26 adjacent a first side edge thereof. The hinge plates 20, 22 and 24, 26 are received in overlapping relation with the outer hinge plates 20, 22 having inwardly extending pins (not shown) which are received in aligned openings (not shown) in the inner hinge plates 24, 26 for hingeably joining the base 16 and cover 18. In this regard, it is pointed out that the base 16 and cover 18 are hingeably movable to a closed position wherein the base 16 and cover 18 define an interior cavity and an edge opening opposite the hinge edge (FIGS. 1 and 6). The base 16 and cover 18 are maintained in a closed position by integrally formed mateable formations 28 and 28A respectively, positioned adjacent the edge opening. The formations 28 are snap received in mated, releasable engagement when the base 16 and cover 18 are moved to the closed position. The edge opening is defined by a downwardly extending arcuate ridge 30 on the front edge of the cover 18 and an upwardly extending arcuate ridge 32 on the front edge of the base 16 such that when the base 16 and cover 18 are in the closed position, the ridges 30, 32 define an elongate oval edge opening. The base 16 and cover 18 are further movable to an open position wherein the interior cavity is exposed for access to the disc 15 (FIG. 2).

The disc holder 14 is received on top of the base 16 and includes a spine portion 34 positioned adjacent the hinge edge. Preferably, the spine 34 is affixed by suitable means, such as spring tabs (not shown), to the hinge pin 28 to maintain the disc holder 14 in fixed position within the case 12. The spine 34 merges outwardly from a central portion thereof in a generally U-shaped configuration to form a pair of spaced arm portions 36, 38 respectively, which terminate in distal ends adjacent the edge opening. The disc holder 14 further includes a raised shoulder 40 extending in an arcuate contour around the arm portions 36, 38 and the spine portion 34 with the arcuate contour opening outwardly toward the edge opening. The raised shoulder 40 cooperates with the arm portions 36, 38 and the spine portion 34 to define a guide wall or ledge 42 which is operative for supporting the bottom edge margin of the disc 15 in spaced relation from the bottom wall portion of the base 16, while the raised shoulder 40 is operative for engaging the peripheral side edges of the disc 15. The raised shoulder 40 extends in an arc of greater than 180 degrees wherein the end points 44, 46 respectively of the arc define capture points which capture the disc 15 when the disc is received between the arm portions 36, 38. More specifically, the arc centerline 48 (FIG. 6) is disposed along the longitudinal centerline 50 (FIG. 3) of the case 12 so that the opening of the arc faces the edge opening of the case 12 and the capture points 44, 46 are symmetrical about the centerline 50 of the case 12.

Figure 3:
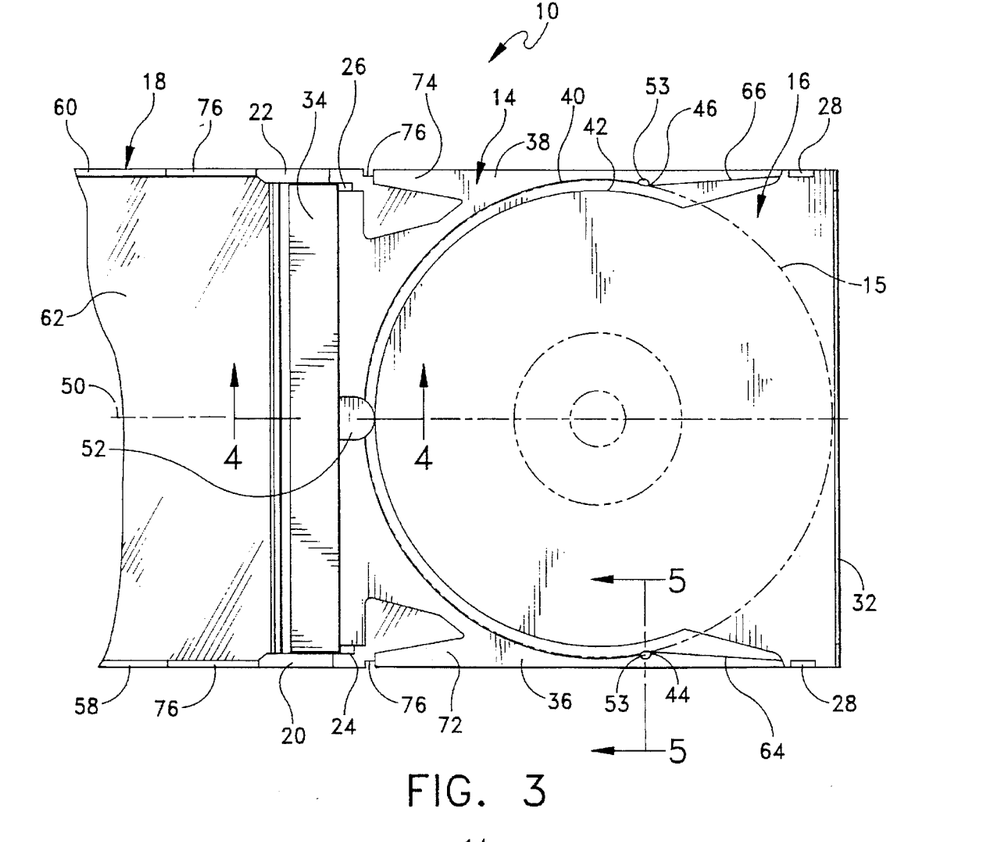
FIG. 3 is a top view thereof with the cover in an open position and a disc inserted into the disc holder.
Figure 4:
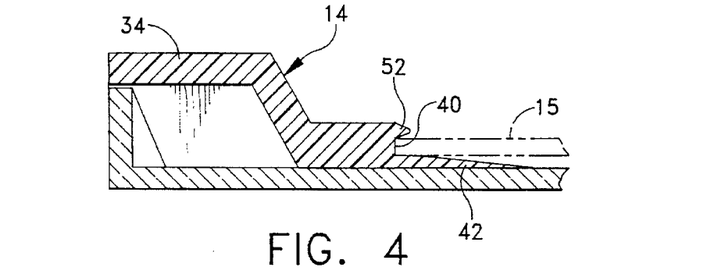
FIG. 4 is a cross-sectional view thereof taken along line 4—4 of FIG. 3.
Figure 5:
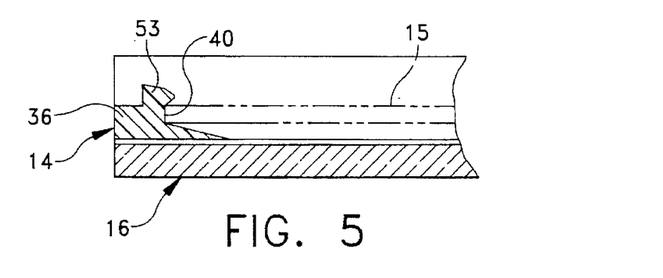
FIG. 5 is a cross-sectional view thereof taken along line 5—5 of FIG. 3.
Figure 9:
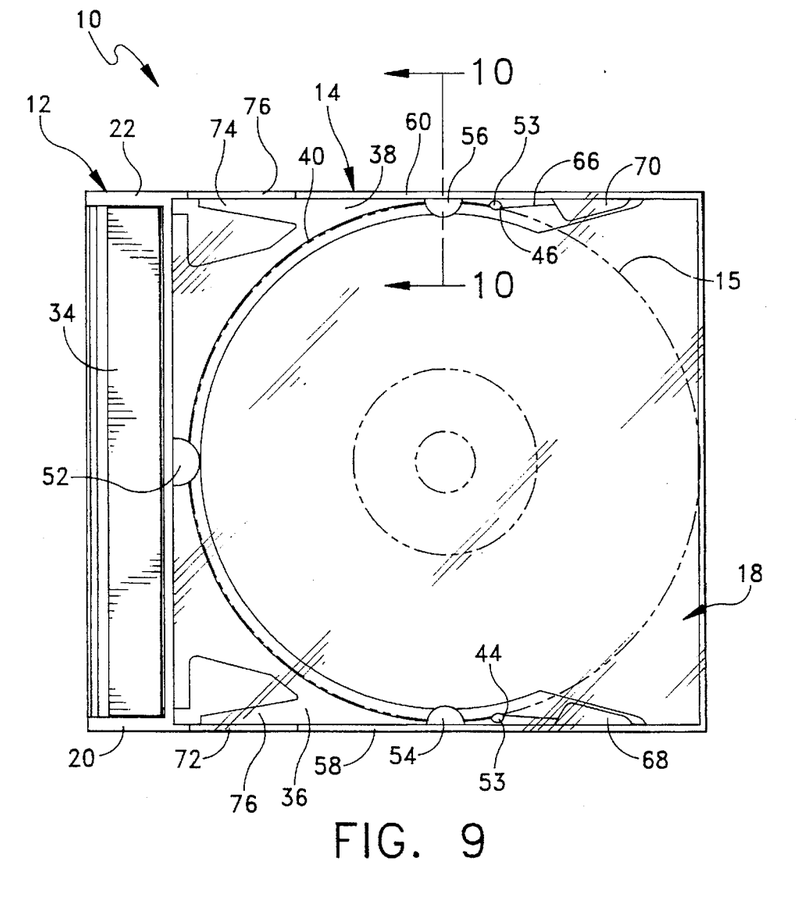
FIG. 9 is yet another top view thereof with the disc fully inserted into the disc holder through the edge opening.
Figure 10:
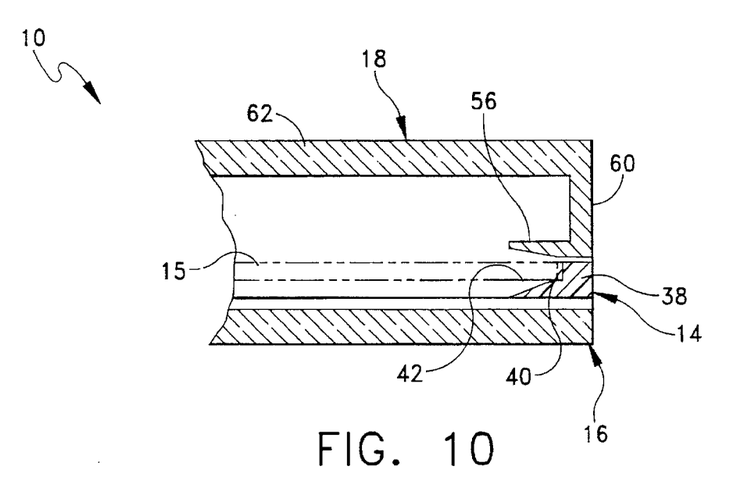
FIG. 10 is a cross-sectional view thereof taken along line 10—10 of FIG. 9.
Figure 11:
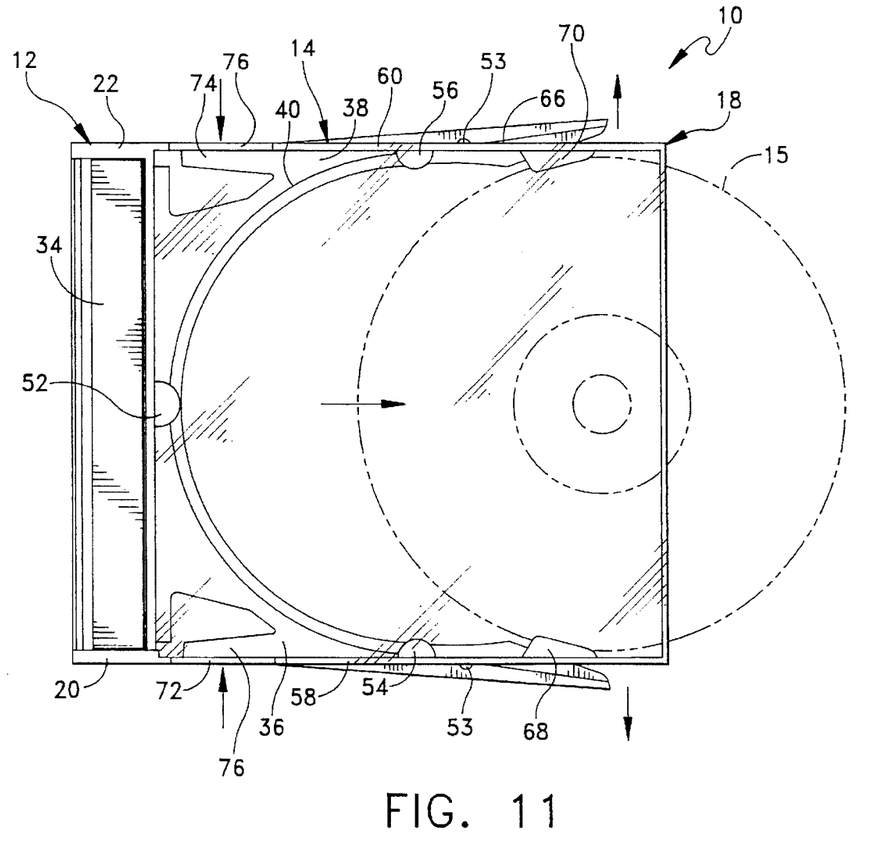
FIG. 11 is still another top view thereof with the opposing finger cams depressed to release the disc from the disc holder.

Referring now to FIGS. 3, 4 and 5, the disc 15 can be mounted in the disc holder 14 while the case 12 is open by pressing the disc 15 downwardly into the arcuate recess formed by the ledge 42 and raised shoulder 40. In this regard, it is pointed out that the arm portions 36, 38 of the disc holder 14 are normally biased to a slightly inward position so that the raised shoulder 42 is slightly out of round compared to the shape of the disc 15. In this manner, the peripheral side edges of the disc 15 can be frictionally held by the raised shoulder 40 when the disc 15 is positioned between the arm portions 36, 38. The disc 15 is further maintained within the disc holder 14 by a tab 52 which extends outwardly from the spine 34 in spaced parallel relation to the ledge 42 (FIG. 4), and further by a pair of tabs 53 positioned adjacent to the end points 44, 46 of the shoulder 40 (FIG. 5). Tab 52 and tabs 53 overlap and engage the top edge margin of the disc 15 when inserted into the disc holder 14. When the cover 18 is thereafter closed, the disc 15 is still further maintained in position in the disc holder 14 by a pair of opposing tabs 54, 56 respectively, which extend inwardly from sidewall portions 58, 60 respectively, of the cover 18 (FIG. 9). The tabs 54, 56 extend inwardly in parallel spaced relation to the top wall portion 62 of the cover 18 and overlie the top edge margin of the disc 15.

Figure 8:
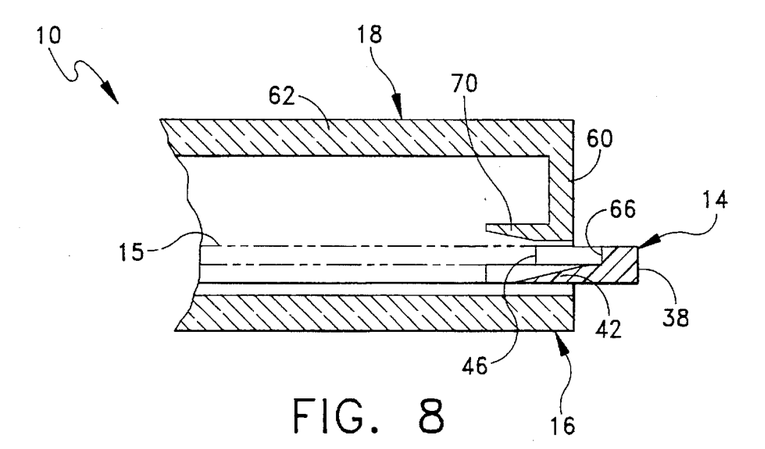
FIG. 8 is a cross-sectional view thereof taken along line 8—8 of FIG. 6.

Alternatively, the disc 15 can be inserted into the disc holder 14 through the edge opening while the case 12 is closed (See FIGS. 6–11). The ridges 30, 32 of the oval edge opening engage the peripheral side edges and edge margins of the disc 15 to prevent scratching of the optical surface of the disc 15 when the disc is inserted through the edge opening. The ridges 30, 32 further guide movement of the disc 15 between the arm portions 36, 38. Referring to FIG. 5, as the disc 15 enters the case 12, the peripheral side edges of the disc 15 engage opposing tapered surfaces 64, 66 respectively, of the raised shoulder 40. The tapered surfaces 64, 66 extend from the distal ends of the arm portions 36, 38 inwardly to the end points 44, 46 of the arcuate shoulder 40. As the disc 15 is urged inwardly, the peripheral side edges thereof ride on the tapered surfaces 64, 66 and force the arm portions 36, 38 outwardly. Once the disc 15 passes inwardly of the end points 44, 46 of the arcuate shoulder 40, the arm portions 36, 38 resiliently spring back to their original position to capture the disc 15 (FIG. 8). The cover 18 further includes opposing guide tabs 68, 70 respectively, which guide insertion of the disc 15 into the interior cavity when inserted through the edge opening. The guide tabs 68, 70 extend inwardly from the sidewall portions 58, 60 of the cover 18 in spaced parallel relation to the top wall portion 62 of the cover 18. It is noted that the guide tabs 68, 60 cooperate with the tabs 54, 56 to hold a sheet of written material (not shown) adjacent to the transparent top wall portion 62 of the cover 18 to identify the disc therein, and it is further noted that the tabs 68, 70 also operate to guide insertion of the disc 15 through the edge opening.

The disc 15 is released from the disc holder 14 by a cam arrangement which is provided for resiliently deflecting the arm portions 36, 38 outwardly to a deflected position (FIG. 10) to disengage the capture, or end, points 44, 46 of the raised shoulder 40 from the side edges of the disc 15. The cam arrangement comprises a pair of rearwardly extending, opposing fingers 72, 74 respectively, positioned on the outer peripheral edges of the arm portions 36, 38 wherein inward pressure on the fingers 72, 74 causes movement of the arm portions 36, 38 from a normal position (FIG. 10) to their deflected position (FIG. 8). The cover 18 and base 16 preferably include opposing notched areas 76 for accessing and exerting pressure on the opposing fingers 72, 74 when the base 16 and the cover 18 are in the closed position.

In use, the operator may hingeably open the cover 18 and mount a disc 15 in the disc holder 14 by positioning the disc 15 in the arcuate contoured recess formed by the raised shoulder 40, and further may remove the disc 15 by grasping the side edge of the disc 15 and pulling upwardly, similarly to a conventional disc holder arrangement. When the disc 15 is removed in an upward motion, the disc 15 engages the tapered edges 75 of the tabs 53 and forces the arm portions 36, 38 outwardly to release the disc from the holder 14.

Alternatively, the operator may also maintain the case 12 in a closed position and slidably insert the disc 15 into the disc holder 14 through the edge opening. The arcuate ridges 30, 32 at the edge opening, along with the guide tabs 68, 70 effectively guide the disc 15 between the arm portions 36, 38 so that it is properly received and captured in the arcuate contour of the disc holder 14. In the latter mode of operation, inward movement of the disc 15 causes the disc edges to engage the raised shoulder 40 and urge the arm portions 36, 38 outwardly to enable the disc to pass the capture points 44, 46 of the raised shoulder 40. The operator may release the disc 15 from the case 12 while the case 12 is maintained in the closed position by applying inward pressure to the fingers 72, 74 of the disc holder 14. Inward pressure of the finger 72, 74 urges the arm portions 36, 38 in an outward direction thereby disengaging the capture points 44, 46 of the raised shoulder 40 from the peripheral side edges of the disc 15 and releasing the disc 15 for sliding movement out of the edge opening of the case 12. It is important to note that pressure may be applied to the fingers 72, 74 with one hand wherein the thumb and forefinger of the operator are simultaneously squeezed together thus allowing removal of the disc 15 from the case 12 with only one hand.

Figure 12:
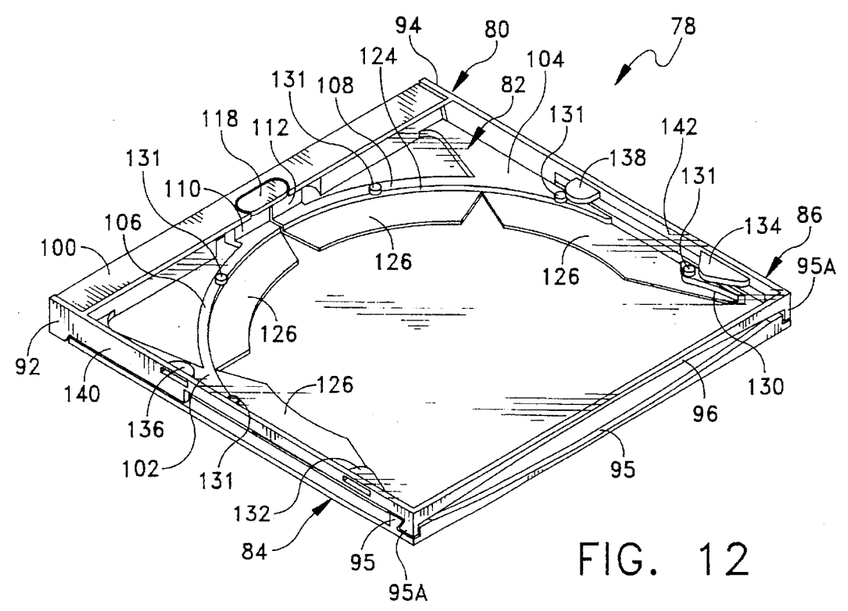
FIG. 12 is a perspective view of a second embodiment of the instant jewel case.
Figure 13:
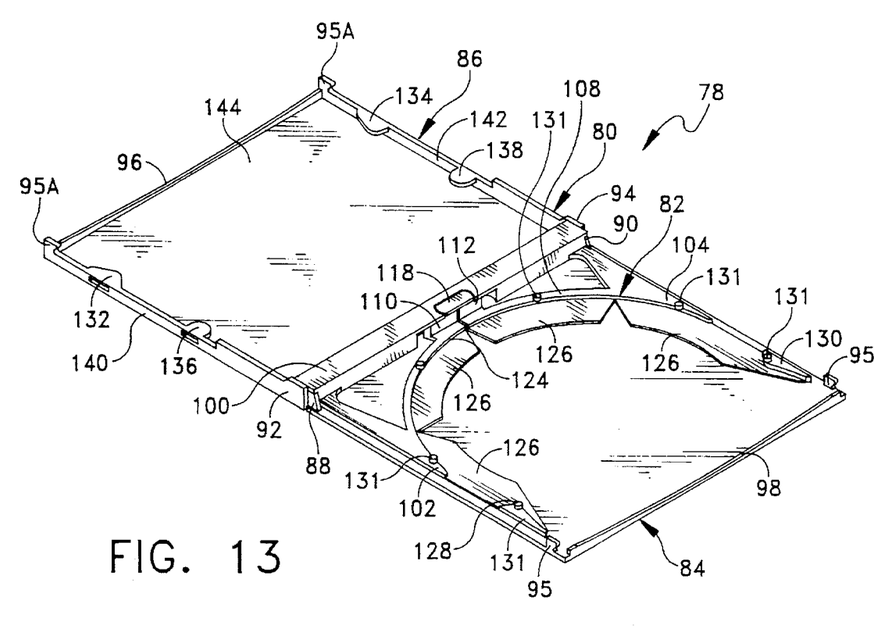
FIG. 13 is another perspective view thereof with the cover in an open position.
Figure 17:
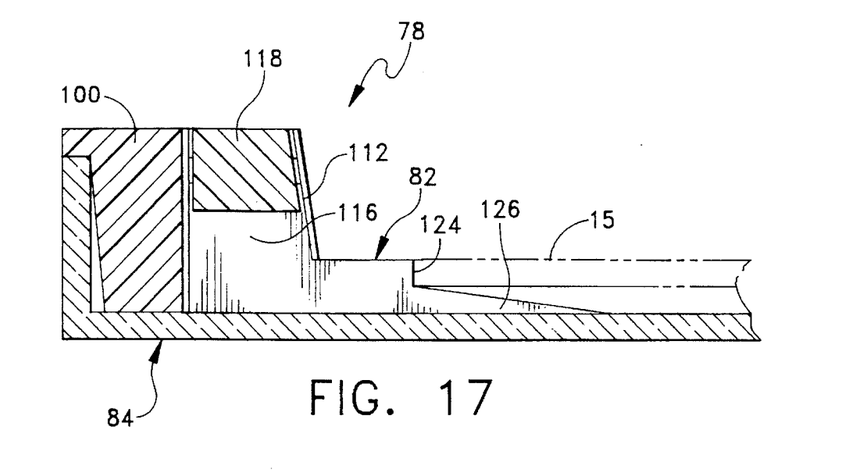
FIG. 17 is a cross-sectional view thereof taken along line 17—17 of FIG. 14.
Figure 18:
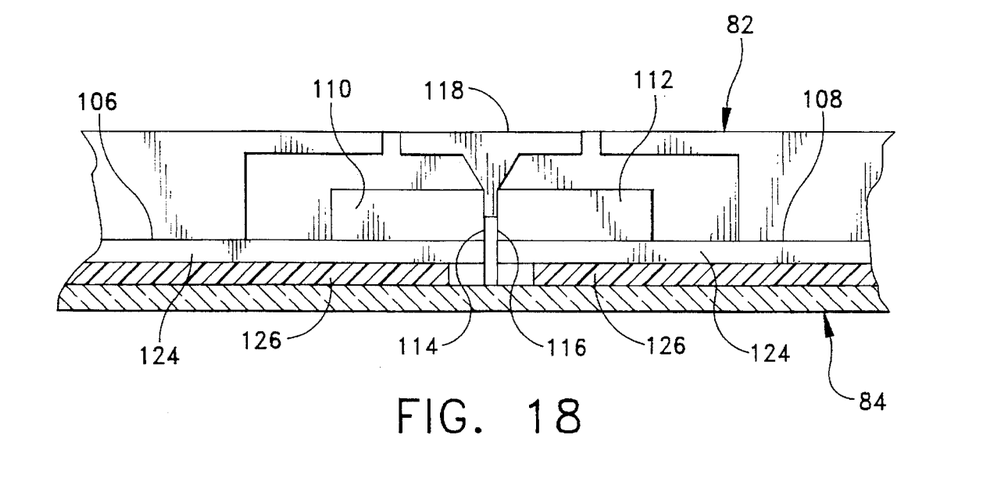
FIG. 18 is another cross-sectional view thereof taken along line 18—18 of FIG. 15.
Figure 19:
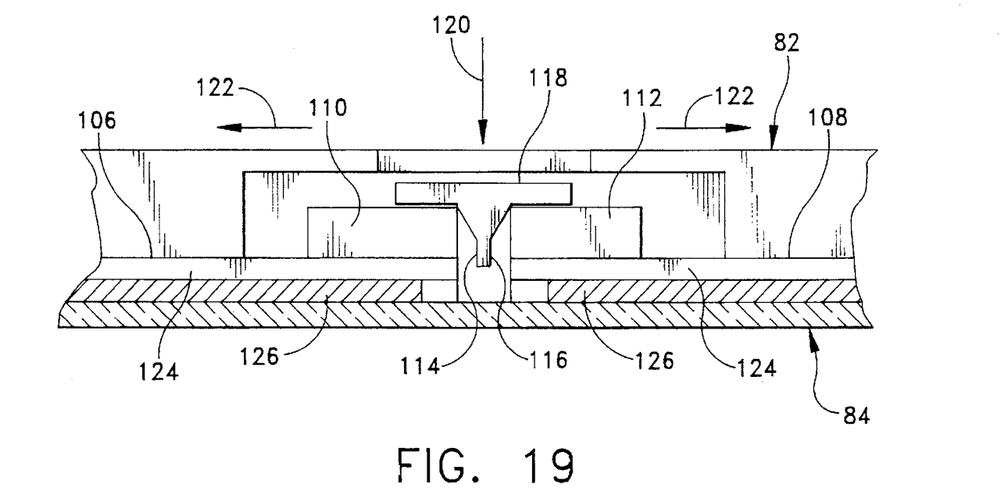
FIG. 19 is a similar cross-sectional view showing the wedge-shaped cam member depressed downward to spread apart the arms of the disc holder.
Figure 20:
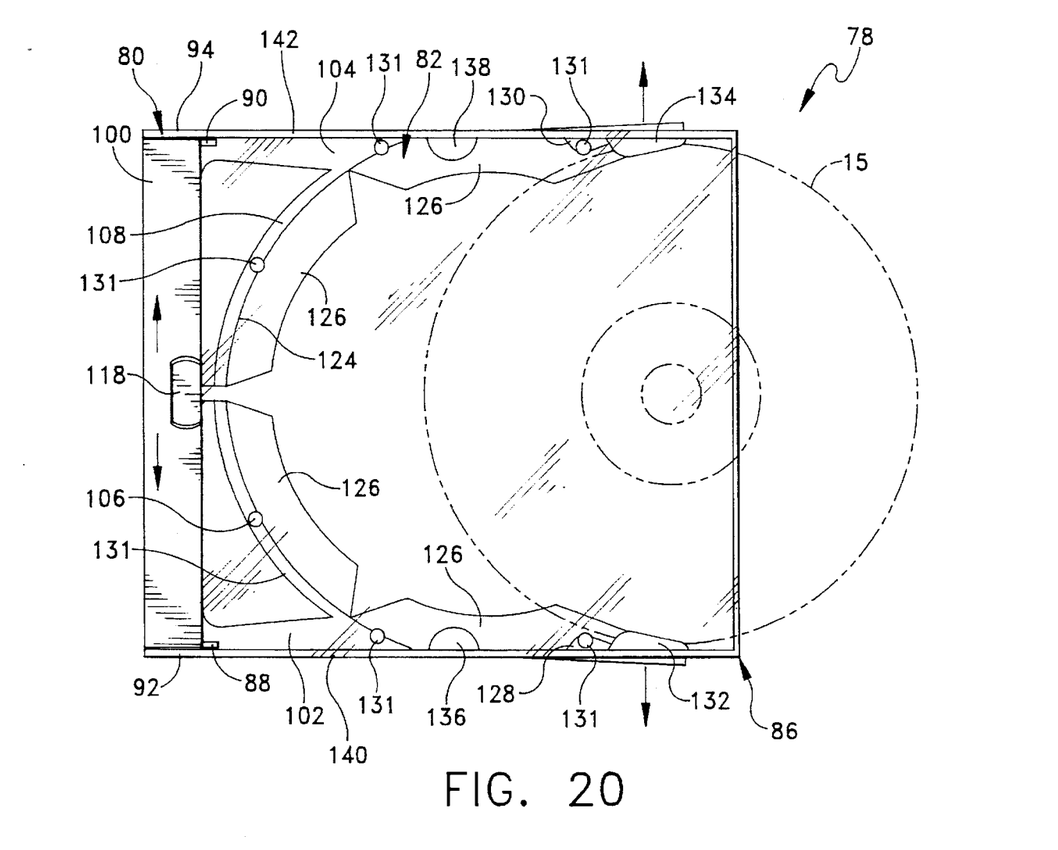
FIG. 20 is a top view thereof showing the disc being released from the jewel case.

Referring now to FIGS. 12–20, a second embodiment of the jewel case is illustrated and generally indicated at 78. The jewel case 78 comprises a transparent hinged case generally indicated at 80, and a resilient disc holder generally indicated at 82 that is received inside the case 80. The case 80 includes a transparent base generally indicated at 84 and a transparent cover generally indicated at 86 which are hingeably joined along a side edge thereof. More specifically, the base 84 includes opposing hinge plates 88, 90 respectively, adjacent a first side edge thereof, while the cover 86 includes opposing hinge plates 92, 94 adjacent a first side edge thereof. The hinge plates 88, 90 and 92, 94 are received in overlapping relation with the outer hinge plates 92, 94 having inwardly extending pins (not shown) which are received in aligned openings (not shown) in the inner hinge plates 88, 90 for hingeably joining the base 84 and cover 86. The base 84 and cover 86 are hingeably movable to a closed position similar to the first embodiment wherein the base 84 and cover 86 define an interior cavity and an edge opening opposite the hinge edge (FIGS. 12 and 17). The base 84 and cover 86 are maintained in a closed position by integrally formed mateable formations 95 and 95A respectively, positioned adjacent the edge opening. The formations 95 are snap received in mated, releasable engagement when the base 84 and cover 86 are moved to the closed position. Similar to the first embodiment, the edge opening is defined by a downwardly extending arcuate ridge 96 on the front edge of the cover 86 and an upwardly extending arcuate ridge 98 on the front edge of the base 84 such that when the base 84 and cover 86 are in the closed position, the ridges 96, 98 define an elongate oval edge opening. The base 84 and cover 86 are further movable to an open position wherein the interior cavity is exposed for access to the disc 15 (FIG. 13). While the base 84 and cover 86 of the case 12 are similar to the first embodiment, the disc holder 82 is somewhat different. The disc holder 14 is received on top of the base 84 and includes a spine portion positioned adjacent the hinge edge. Preferably, the spine 100 is affixed by suitable means to the base 84 to maintain the disc holder 82 in fixed position within the case 12. Extending outwardly from the end portions of the spine 100 are two spaced arm portions 102, 104 respectively, which terminate in distal ends adjacent the edge opening. Each of the arm portions 102, 104 includes a curved dependent appendage 106, 108 respectively, which merges inwardly and rearwardly from the arm portion. The terminal ends of the appendages 106, 108 terminate in facing actuator tabs 110, 112 respectively, with faces 114, 116 respectively, disposed along the longitudinal centerline of the case. Positioned between the actuator tabs 110, 112 is a wedge shaped cam 118 which is slidably movable in a downward direction (arrow 120) for urging the actuator tabs 110, 112 in an outward direction (arrows 122), the operation of which will be further described hereinafter (FIG. 18). The disc holder 82 further includes a raised shoulder 124 extending in an arcuate contour around the arm portions 102, 104 and the appendages 106, 108 with the arcuate contour opening outwardly toward the edge opening. The raised shoulder 124 cooperates with the arm portions 102, 104 and the appendages 106, 108 to define ledge 126 which are operative for supporting the bottom edge margin of the disc 15 while the raised shoulder 124 is operative for engaging the peripheral side edges of the disc 15. The raised shoulder 124 extends in an arc of greater than 180 degrees wherein the end points 128, 130 respectively, of the arc define capture points which capture the disc 15 when the disc is received between the arm portions 106, 108. The centerline of the arc is disposed along the longitudinal centerline of the case 80 so that the opening of the arc faces the edge opening of the case and the capture points 128, 130 are symmetrical about the centerline of the case.

Figure 14:
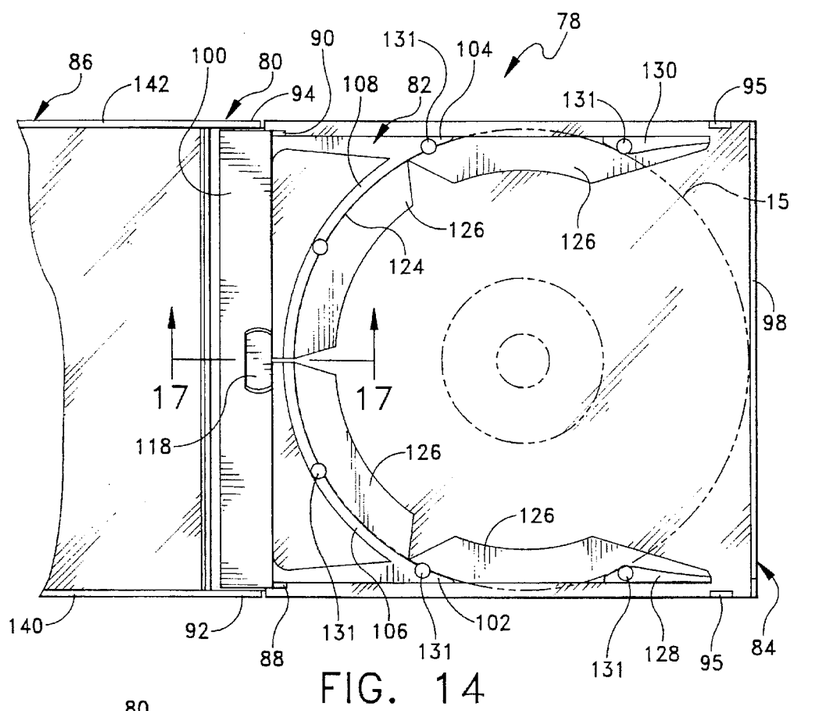
FIG. 14 is a top view thereof with the cover in an open position and a disc inserted into the disc holder.
Figure 15:
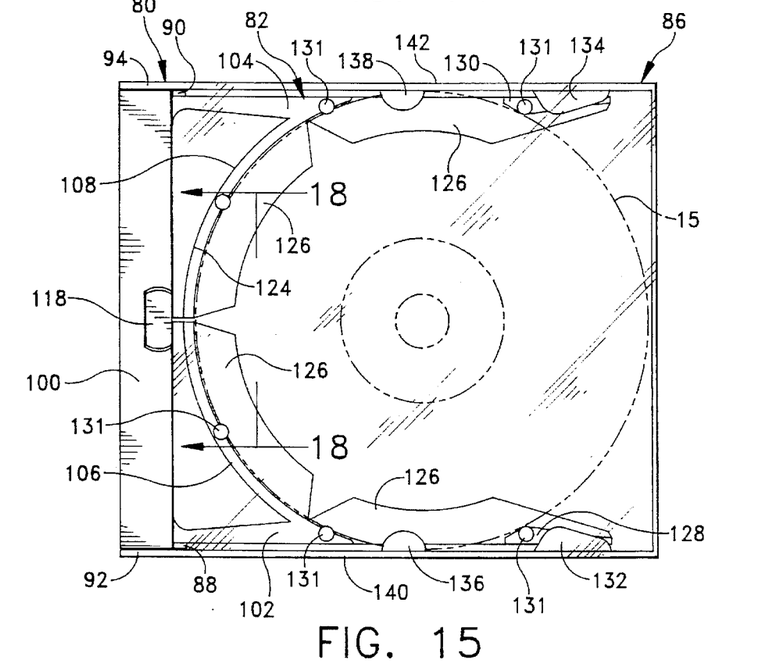
FIG. 15 is a top view thereof with the cover in a closed position and a disc inserted into the disc holder from the edge opening.
Figure 16:
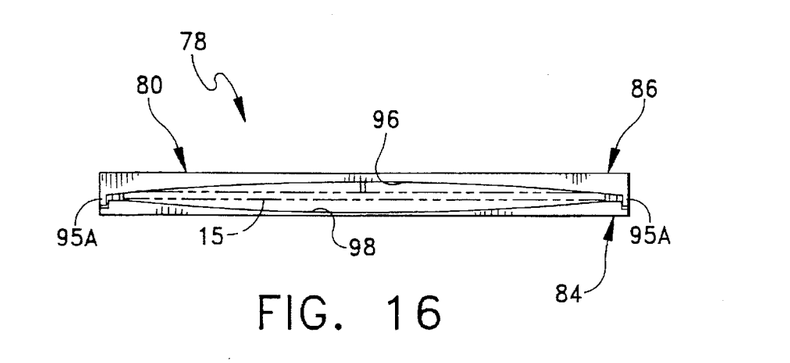
FIG. 16 is an end view thereof showing the edge opening.

Referring now to FIG. 14, the disc 15 can be mounted in the disc holder while the case 80 is open by pressing the disc downwardly into the arcuate recess formed by the ledges 126 and raised shoulder 124. In this regard, it is pointed out that the arm portions 102, 106 of the disc holder 82 are normally biased to a slightly inward position so that the raised shoulder 124 is slightly less round that the shape of the disc 15. In this manner, the peripheral side edges of the disc can be frictionally held by the raised shoulder 124 when the disc is positioned between the arms 102, 104. The disc 15 is further maintained in position by a plurality of tabs 131 which overhang and engage the top edge margin of the disc 15 when inserted into the disc holder 14. (Tabs 131 are substantially identical to tabs 53 in the first embodiment.) Removal of the disc 15 is accomplished by grasping the edges of the disc and pulling upward. Upward movement of the disc 15 causes the disc edges to raise against the tapered edges of the tabs 131 forcing the arm portions 106, 108 outwardly to release to disc 15.

Alternatively, the disc 15 can be inserted into the disc holder 82 through the edge opening while the case 80 is closed (See FIG. 14). The ridges 96, 98 of the oval edge opening engage the peripheral side edges and edge margins of the disc 15 to prevent scratching of the optical surface of the disc 15 when the disc is inserted through the edge opening. The ridges 96, 98 further guide movement of the disc 15 between the arm portions 102, 104. As the disc 15 enters the case 80, the peripheral side edges of the disc 15 engage the opposing protrusions 128, 130, and as the disc 15 is urged further inwardly, the arm portions 102, 104 are forced outwardly. Once the disc 15 passes inwardly of the protrusions 128, 130, the arm portions 102, 104 resiliently spring back to their original position to capture the disc 15 (FIG. 14).

The cover 86 further includes two spaced pairs of opposing tabs 132, 134 and 136, 138 respectively, which guide insertion of the disc 15 into the interior cavity when inserted through the edge opening. The opposing tabs 132, 134, 136, 138 extend inwardly from the sidewall portions 140, 142 of the cover 86 in spaced parallel relation to the top wall portion 144 of the cover 86 and cooperate to hold a sheet of written material (not shown) adjacent to the top wall portion 144 of the cover 86 to identify the disc therein.

The disc 15 is released from the disc holder 82 by the previously described cam arrangement which is operative for resiliently deflecting the arm portions 102, 104 outwardly to a deflected position (FIG. 10) to disengage the protrusions 128, 130 from the side edges of the disc 15. In this regard, the wedge shaped cam 118 is disposed for sliding movement in the space formed between the facing actuator tabs 110, 112 of the disc holder 82. The cam 118 is slidably movable in a downward direction (arrows 120 FIG. 18) to forcibly urge the tabs 110, 112 apart thereby moving the connected arm portions 102, 104 in an outward direction.

In use, the operator may hingeably open the cover 86 and mount a disc 15 in the disc holder 82 by positioning the disc 15 in the arcuate contoured recess formed by the raised shoulder 124, and further may remove the disc 15 by grasping the side edge of the disc 15 and pulling upwardly, similarly to a conventional disc holder arrangement. The operator may also maintain the case 80 in a closed position and slidably insert the disc 15 into the disc holder 82 through the edge opening. The arcuate ridges 96, 98 at the edge opening, along with the guide tabs 132, 134, 136, 138 guide the disc 15 between the arm portions 102, 104 so that it is properly received and captured in the arcuate contour of the raised shoulder 124. The operator may release the disc 15 from the case 80, while the case 80 is maintained in the closed position by applying downward pressure to the cam 118 of the disc holder 82. Downward pressure of the cam 118 urges the actuator tabs 110, 112 and arm portions 102, 104 apart thereby disengaging the protrusions 128, 130 from the peripheral side edges of the disc 15 and releasing the disc 15 for sliding movement out of the edge opening of the case 80. Downward pressure may, be applied to the cam 118 with one hand wherein the case 80 is held in the operators hand with the operator's thumb positioned on top of the cam 118.

It can therefore be seen that the instant invention provides an effective and improved jewel case for compact audio laser discs. The improved jewel case effectively provides the benefits of the prior art cases, i.e. top cover opening and resilient disc holder, while also providing the ability to insert the disc into the case and remove the disc from the case with the cover closed with a single hand. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A jewel case for a disc element comprising:

a case including a generally rectangular base, and a generally rectangular cover which are hingeably joined along a first side edge thereof, said base and said cover being hingeably movable to a closed position wherein said base and said cover are received in interfitting relation to define an interior cavity for receiving a disc element therein and to further define an edge opening opposite said first side edge, said base and said cover further being movable to an open position wherein the interior cavity is exposed for access to said disc element;

a resilient disc holder positioned in said case for receiving a disc element thereon, said disc holder including a spine portion arranged adjacent to the first side edge of the case, said spine portion merging outwardly from a central portion thereof in a U-shaped configuration to form a pair of spaced arm portions which terminate adjacent to the edge opening, said disc holder including a raised shoulder extending in an arcuate contour around the arm portions and the spine portion, said arcuate contour opening outwardly toward said edge opening, said raised shoulder cooperating with said arm portions to define a ledge which receives and supports the edge margin of the disc while the raised shoulder engages the peripheral side edges of the disc, said raised shoulder extending in an arc of greater than 180 degrees wherein the end points of the arc define capture points which capture the disc within said arcuate contour when the disc is received between said arm portions; and means for resiliently deflecting said arm portions outwardly to a deflected position wherein said capture points are disengaged from the peripheral side edges of the disc element thereby releasing said disc element from said arm portions.

2. The jewel case of claim 1 wherein said means for resiliently deflecting said arm portions outwardly comprises rearwardly extending, opposing fingers positioned on the outer peripheral edges of said arm portions wherein inward pressure on said fingers causes movement of said arm members from a normal position to said deflected position.

3. The jewel case of claim 2 wherein said cover includes notched areas for accessing and exerting pressure on said fingers when said base and said cover are in said closed position.

4. The jewel case of claim 1 wherein said edge opening includes an upwardly extending arcuate ridge, and further includes a downwardly extending arcuate ridge such that said ridges define an elongate oval edge opening for guiding the disc element into the interior cavity of the case.

5. The jewel case of claim 1 further comprising a first pair of opposing guide tabs extending inwardly from opposing sidewalls of said cover adjacent to said edge opening, said guide tabs extending in parallel spaced relation to a top wall of the cover.

6. The jewel case of claim 5 further comprising a second pair of opposing guide tabs extending inwardly from said sidewalls adjacent a center area of the sidewalls, said guide tabs extending in parallel spaced relation to a top wall of the cover.

7. The jewel case of claim 1 wherein said cover includes a transparent top wall.

8. A jewel case for a disc element comprising:

rectilinear base and cover members which are hinge connected along a first side edge thereof, said base member and said cover member cooperating to define an interior cavity for receiving said disc element when said base member and said cover member are in a closed position, said base member and said cover member further cooperating to define an edge opening along a second side edge thereof when said base member and said cover member are in said closed position engagement means within said interior cavity for releasably engaging a peripheral side edge of said disc element, said disc element being fully exposed and accessible for removal when said base member and said cover member are in an open position, said engagement means being movable between a normal engagement position for engaging said disc element, and a second release position for releasing said disc element for removal of said disc through said edge opening; and actuator means for actuating said engagement means between said engaging and releasing positions.

9. The jewel case of claim 8 wherein said engagement means comprises movable engagement arms which engage peripheral side edges of said disc at predetermined capture points.

10. The jewel case of claim 9 wherein said engagement arms are resilient and are spring biased to said normal engagement position.

11. The jewel case of claim 9 wherein said engagement arms include engagement tabs which overlap and engage an upper edge margin of said disc when said disc is received between said engagement arms.

12. The jewel case of claim 9 wherein said engagement arms are disposed adjacent to said base member, said jewel case further including a plurality of spaced guide tabs extending inwardly from each of two opposing sidewalls of said cover member, said guide tabs extending in parallel spaced relation to a top wall of said cover member and cooperating with said cover member to define a space for receiving a sheet of material.

13. The jewel case of claim 8 wherein said actuator means includes an actuator element disposed externally of said base and cover members so that said engagement means can be actuated for release of said disc element when said base member and said cover member are in said closed position.

14. The jewel case of claim 8 wherein said actuator means includes an actuator element disposed externally of said base and cover members so that said engagement arms can be actuated for release of said disc element when said base member and said cover member are in said closed position.

* * * * *